United States Patent [19]

Jerome et al.

[11] 4,321,622

[45] Mar. 23, 1982

[54] VIDEO TRACK TRANSFER SYSTEM AND METHOD

[75] Inventors: Jonathan A. Jerome, Palo Alto; Frank D. Neu, Castro Valley; Geoffrey T. Faraghan, Oakland, all of Calif.

[73] Assignee: McDonnell Douglas Corporation, Long Beach, Calif.

[21] Appl. No.: 97,328

[22] Filed: Nov. 26, 1979

[51] Int. Cl.³ .............................................. H04N 5/76
[52] U.S. Cl. .................................. 358/128.5; 369/44; 369/46
[58] Field of Search .................... 360/8, 9, 10, 19, 77, 360/78, 72.2; 179/100.1 G, 100.3 V, 100.3 B; 358/128.5, 152; 250/202, 203; 369/46, 44, 43, 50, 120

[56] References Cited

U.S. PATENT DOCUMENTS

| | | | |
|---|---|---|---|
| 3,198,880 | 8/1965 | Toulon | 358/128.5 |
| 3,381,086 | 4/1968 | De Moss | 179/100.3 V |
| 3,737,877 | 6/1973 | Feinleib | 179/100.3 V |
| 3,789,137 | 1/1974 | Newell | 360/8 |
| 3,829,610 | 8/1974 | Meeussen | 360/10 |
| 3,919,697 | 11/1975 | Walker | 360/77 |
| 4,084,185 | 4/1978 | DeLang | 179/100.3 V |
| 4,106,058 | 8/1978 | Romeas | 179/100.3 V |
| 4,118,735 | 10/1978 | Wilkinson | 179/100.1 G |
| 4,138,663 | 2/1979 | Lehureau | 179/100.3 V |

OTHER PUBLICATIONS

"A Random Access System Adapted for the Optical Videodisc" by M. Mathieu, Journal of SMPTE, Feb. 1977, pp. 80-83.

Primary Examiner—Bernard Konick
Assistant Examiner—Alan Faber
Attorney, Agent, or Firm—Gregory A. Cone; George W. Finch; Donald L. Royer

[57] ABSTRACT

TV playback apparatus and method for a record having track sets comprising video track analogs and a plurality of audio track analogs disposed between the video tracks. All tracks in a respective track set are sensed for playback by a movable reading head incorporating a combination of video and audio sensing elements and including tracking of homing elements flanking the video reading element. A track set switching signal is sensed from the audio signal by an audio reading element for a controller means which very quickly slews the reading head to roughly position the video reading element for next video track. Such video track is sensed by any reading element in the reading head and determined through a multiplexer and controller means. Reading head is further stepped as necessary until video track sensing element is reading video track as controller receives video signal through band pass filter video sensing element. Position adjustment further made by controller, only as necessary, responsive to respective signals by tracking elements. The entire switching cycle from one video track to next is completed in substantially less time than attainable by any previously known prior art method or apparatus.

4 Claims, 3 Drawing Figures

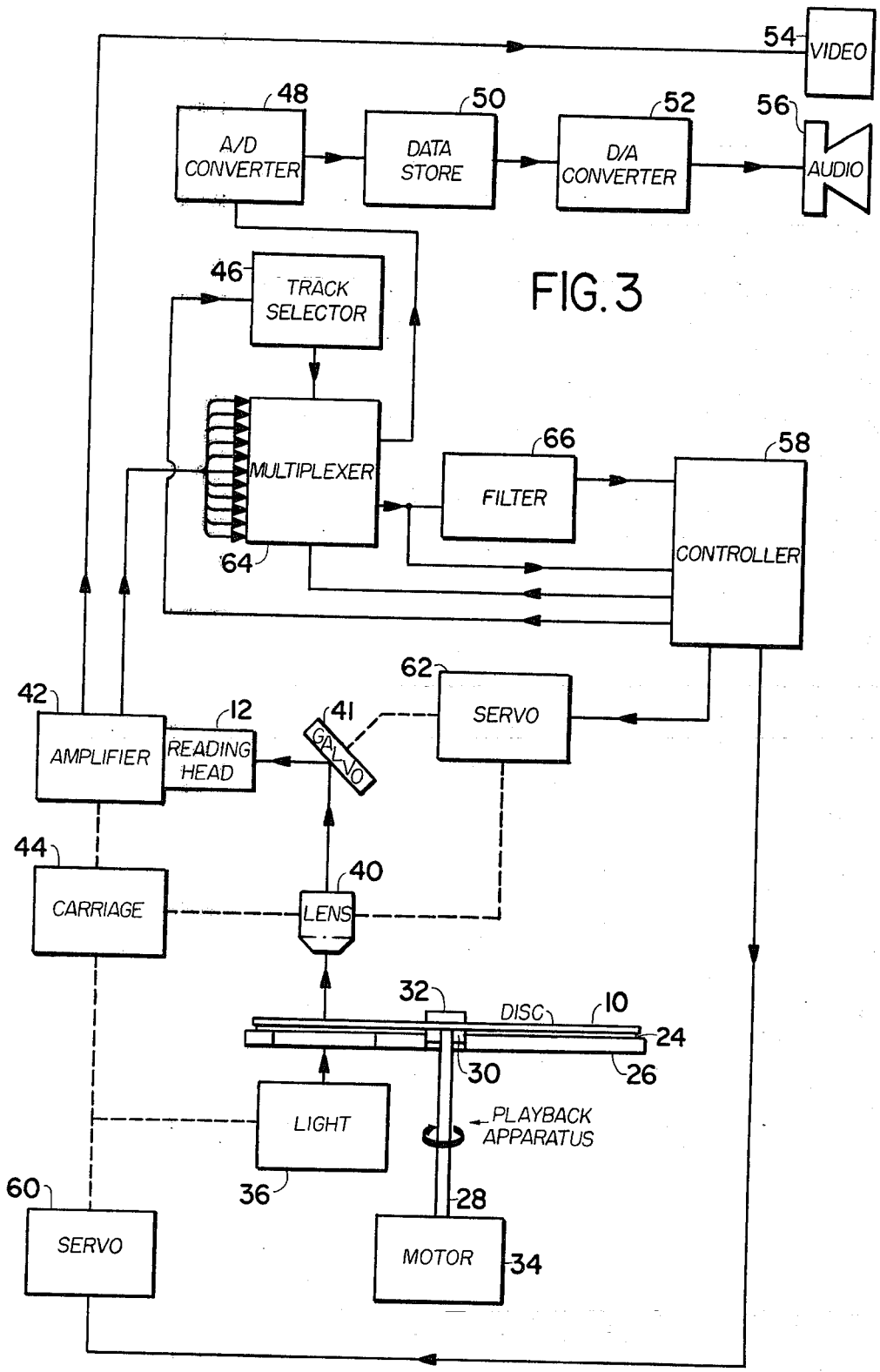

VIDEO TRACK TRANSFER SYSTEM AND METHOD

This invention generally pertains to a method and apparatus for the retrieval and presentation of information and more particularly pertains to the retrieval of television video and audio information from a record medium which is provided with a plurality of tracks forming analogs of both the video and audio information.

BACKGROUND OF THE INVENTION

Known prior art to this invention is disclosed in U.S. patents to Frohback et al. No. 3,371,154; Frohback No. 3,391,247; Hodge No. 3,446,914; Neeussen et al. No. 3,829,610; Wohlmut No. 3,848,095; Mes No. 3,931,457; and Romeas No. 4,106,058, for example, such disclosures being incorporated herein by reference.

The video track transfer system as disclosed and claimed herein is suitable for use with the system and method for reproducing pictures and related audio information as disclosed in co-pending and commonly assigned U.S. patent application to Jerome Ser. No. 73,939 filed Sept. 10, 1979 and entitled "SYSTEM, METHOD AND RECORD MEDIUM FOR REPRODUCING PICTURES AND RELATED AUDIO INFORMATION."

As shown in the incorporated references above identified, video disc and other record media such as magnetic tape have found increasing use and popularity for recording and reproducing television (TV) pictures with sound. Generally, the picture is scanned in discrete frames on a line-by-line basis, the audio information is concurrently recorded with video and audio analog tracks being formed on the record medium. The recorded information is transcribed from the record medium to simultaneously reproduce picture and sound. In such systems the reproduced audio and video signals are approximately coextensive in time.

There have also been approaches to utilize video discs for the reproduction of TV pictures and sound where the sound for each frame is of greater duration than the signal for the TV frame itself, for example, to display a still picture with an extended spoken description or explanation concerning the picture which is particularly useful for teaching or training purposes. A representative system is shown, for example, in U.S. Pat. No. 3,829,610 which shows a system employing a record disc having several concentric tracks of video information in one region of the disc and one or more helical sound grooves in another region with the sound information for each of the video tracks extending over several convolutions of sound grooves. Systems of this type have certain limitations and disadvantages in that separate heads for the sound and picture are relatively expensive, difficult to align and maintain in alignment.

The approach in the above identified co-pending application is to record video information for discrete frames of a TV picture on spaced apart tracks on a record medium such as a disc, recording extended audio information for each frame in a plurality of individual tracks between the video tracks, reading the information from one of the video tracks to reproduce one frame of the picture, and reading the information from successive ones of the corresponding audio tracks to reproduce the extended audio information. The audio tracks for each frame are positioned in relation to the video tracks such that the audio and video tracks are scanned simultaneously by a single reading head.

The information is recorded photographically and read optically. The audio information is recorded in a highly compressed format to further extend the amount of audio information for each frame of the TV picture.

Initially, when all the information was retrieved from a respective video track and its corresponding audio tracks, the reading head was shifted from one track set of a video track and its audio tracks to the next track set through a galvanometer mirror mechanism. The mirror was stepped by the controller sequentially through each of the several tracks until the head was properly positioned on the appropriate successive track set.

Now, an individual step of the galvanometer mirror can be carried out very quickly, less than 5 milliseconds. As a practical matter, however, stringing together a number of such steps requires that each step be carried out at a much slower rate, on the order of 250 msec. per step. Also, each such incremental step has about a 98% probability of occurring correctly so that when 10 steps were taken, the chances of ending incorrectly on a succeeding track set are significant, approximately one in five. Thus, the complete shift requires at least about 2.5 seconds, or more, to move from one video track to the next (assuming a total set of ten tracks). The time of 2.5 seconds is really too slow to be tolerable. Finally, moving the galvanometer mirror rapidly 10 times presents the problem that the stepping range of the mirror would be used up before the head can be appropriately repositioned by external carriage means.

SUMMARY OF THE INVENTION

A general object of the invention is to provide a method and apparatus which will very rapidly shift or "slew" a reading head from one signal analog track to a successive signal analog track and then rapidly "home" the head into playback position, all in a substantially short time period as compared to pertinent prior art methods and apparatus which are presently known.

Another object of the invention is to provide means for scanning the various signals received by the reading head and to locate the spaced relation of a first signal analog track with respect to adjacent other signal analog tracks.

Still another object of the invention is to provide "homing" means to locate a first signal sensing element along with corresponding second signal sensing elements with respect to the signal analog track and to function to home the first signal sensing element on the first signal analog track.

These and other objects are achieved with the disclosed playback method and apparatus when used with a record having respective track sets comprising successively spaced apart analogs of video tracks combined with a plurality of uniformly spaced apart audio tracks respectively disposed adjacent to a corresponding video track. All video and audio signal tracks appearing in a respective track set may be concurrently sensed for playback by a movable reading head incorporating a video track sensing element and a plurality of audio sensing elements disposed in selected array. Such array also includes a pair of tracking or "homing" elements flanking the video tract reading element. A switching signal analog is sensed from a selected location at the end of the audio signal analog by the audio reading circuitry and passed to a controller means including a microprocessor which abruptly slews the reading head to position the video reading element correctly or close to correctly reading the next video track. The next video track is sensed after the slew movement by scanning through the diodes in the reading head. If the reading head is repositioned at variance from correct reading position, galvanometer means provide sequentially stepping through a spacing of one track as necessary until the video track sensing element is substantially at reading position with the video track. After such time as the controller receives no video signal through a frequency discriminator or filter means from the multiple audio sensing elements and the multiplexer detection means, the track switching operation is completed. The entire switching cycle from one video track to the next video track is complete in substantially less time than that required by any method or apparatus known heretofore.

Referring now to the drawing:

FIG. 3 is a simplified block diagram and schematic ilustration of the playback apparatus of the present invention. In FIG. 3, the contributing combination of elements added by the present invention into the combination is presented with bolder lines.

DESCRIPTION OF A PREFERRED EMBODIMENT

Figure 1:
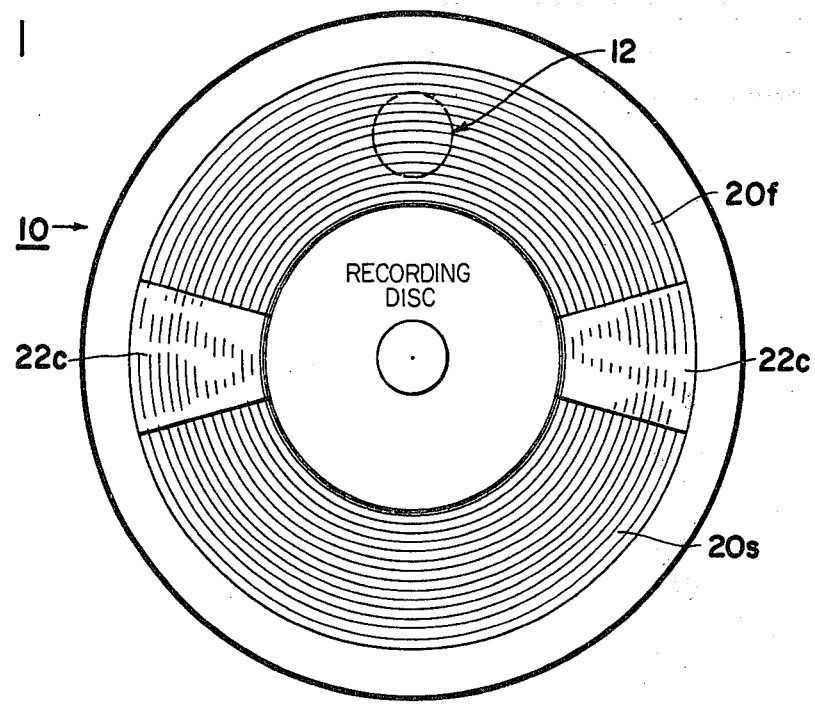
FIG. 1 is a somewhat schematic plan view of a record medium in disc form having analogs of video and audio information formed or recorded thereon.
Figure 2:
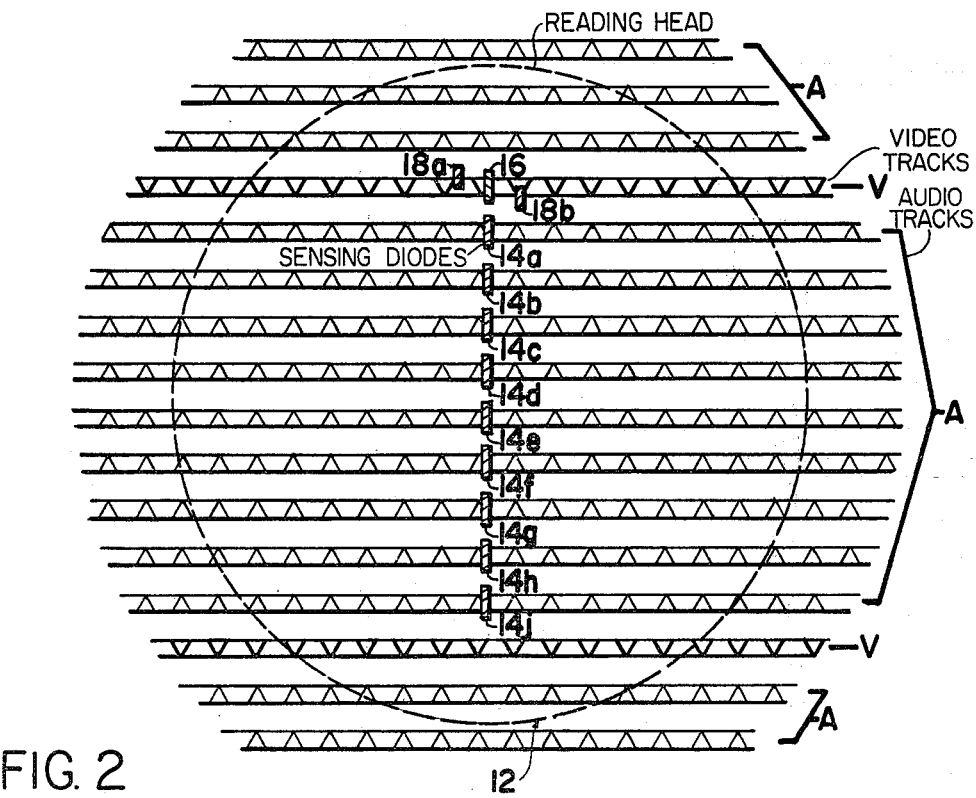
FIG. 2 is an enlarged fragmentary view of the record of FIG. 1 with a schematic view of the multiple element sensing head superimposed thereon.

Referring to FIGS. 1 and 2, there is shown a record medium as a disc 10 of sheet material. Shown in dashed lines in FIGS. 1 and 2 is a multiple sensing element array in a sensing head 12. Starting from its outer periphery toward the center is a succession of track sets with each track set including a video track V and a number of audio tracks A as shown.

A preferred embodiment of video disc 10 is fabricated from a circular sheet of film having a photo sensitive emulsion on a light transmissive substrate or base. The film is exposed as later described and developed to vary the light transmissive transparency of the film in accordance with the video and audio information to be recorded thereon. One suitable film material has a fine grained silver halide emulsion on the order of six microns thickness on a 4.5 mil Mylar base.

Though not shown, the record medium can take other forms as desired such as a cylinder having axially spaced recording tracks. Other recording techniques can be employed. However, the photographically prepared video disc as herein described is preferred because it is inexpensive, easy to produce, provides a high storage density, and can be stored and transported as easily as any other developed film or photographic negatives. Also important is that the use of such a record medium permits the use of relatively inexpensive playback apparatus.

The present invention is not presently used in the recording apparatus for recording the track analogs on disc 10 as shown. However, a brief description of the recording is made for purposes of clarity.

Briefly, a TV signal input is applied into a modulator which controls the intensity of a light beam, such as produced by a laser. The modulated light beam is directed by a mirror through an objective lens which focuses the beam on a video disc. The video disc is mounted on a turn-table and driven at a constant speed, for example, 1,800 rpm. The turn-table is connected with a carriage which is movable to align the beam with a number of desired track positions on the disc.

The audio input is applied to an analog-to-digital (A/D) converter. The digital signal of the A/D converter passes into a digital data store and, after an appropriate time interval, out of the data store into a digital-to-analog (D/A) converter and thereon into the modulator to be recorded as previously described for the video signal. The stored digitized data in the data store are read out in high speed bursts whereby the data are highly compressed, for example, to a ratio of 100:1. Thus the compressed data stored on the audio track in a time of 32.768 milliseconds represent real time audio for a period of 3.2768 seconds for each frame of the video picture.

In operation, an unexposed video disc is rotated with the intensity of the record beam varied in accordance with the video information. When a frame from the video signal has been recorded, the turn-table carriage is moved to position the light beam on the first audio track for that frame. The 3.2768 seconds of audio information for this track is read into the compressor buffer in real time and read out in 32.768 milliseconds. Recording of audio continues until the desired number of tracks for the set have been recorded. Then a new track set is recorded consisting of another video track with a group of audio tracks. This process of recording track sets is repeated until the desired number of track sets is obtained or the disc is full. The exposed disc is then removed and developed.

In the presently preferred embodiment herein disclosed, the disc 10 has 5,000 tracks with a 14 micron center-to-center track spacing occupying an annular recording band having an inner radius of eight centimeters and an outer radius of fifteen centimeters. Each track has a width on the order of ten microns. The track spacing is illustrated as being uniform through the entire recording band to accommodate the sensing elements of the reading head 12 as shown in FIGS. 1 and 2. Each track V contains the video information for one complete frame of a TV picture and the sequence of multiple audio tracks A adjacent to each video track V contains the audio information for that complete frame.

For a standard NTSC video signal having approximately 30 frames per second, the disc is rotated at approximately 1,800 rpm and the video information for one frame fills one track V. Each frame comprises two interlaced fields, each of which is made up of 262.5 horizontal lines which are scanned and recorded in a sequential fashion. In the embodiment illustrated, the information for the first field of each frame is recorded in a first sector 20f and the information for the second field is recorded in a second sector 20s. The information which occurs during the vertical retrace intervals is recorded in smaller sectors 22c between the other sectors. If desired, address coding for the different tracks can also be recorded in sectors 22c.

In order to provide extended audio information, a plurality of audio tracks A is provided for each frame of the picture. During playback the information recorded in these tracks can be reproduced successively during repeated scanning of the video track V to provide a still picture with extended real time audio information. In the embodiment illustrated in FIGS. 1 and 2, nine audio tracks are provided for each video track V. With the disc rotating at the speed of approximately 1,800 rpm, each rotation requires 33.33 milliseconds. The total information content for a track can thus be retrieved in 33.33 milliseconds.

By recording the audio information in a compressed format as previously described, the amount of audio information for each frame of the picture can be extended. For example, with the previously described compression ratio of 100:1, the nine audio tracks can provide up to 30 seconds of sound for each frame. A greater or lesser number of audio tracks can be utilized, if desired, with a corresponding increase or decrease in the amount of audio information for each frame. Should the audio information extend past the nine frames of a respective track set, then the subsequent or successive track set can be employed with the video signal being the same on the successive video track V and the audio continued on the successive audio tracks A.

Now referring to FIGS. 2 and 3, the playback apparatus includes a single multiple element reading or sensing head 12. As shown, reading head 12 simultaneously scans the video track V and its audio tracks A for one frame of the picture.

When being played back, the video disc 10 is rotated while supported on an air bearing 24 above a stationary guide table 26. The air bearing 24 is formed by entrainment of air by the rapidly spinning disc relative to the guide table 26. The disc is mounted on a drive spindle 28 and supported on a radial flange 30 and clamped to the flange 30 by means of a threaded circular hub 32. The drive spindle 28 is rotated at substantially constant speed by a drive motor 34.

A light source 36 is positioned beneath a window 38 in table 26 and serves to provide light for reading the information stored on disc 10. As one preferred embodiment, the light source may comprise a resistance filament lamp with a condenser, but any suitable light source, such as a laser, can be employed as desired. The light passing through the table 26 and disc 10 is modulated in intensity by the information recorded on disc 10 and an optical lens 40 projects a magnified image of the tracks to be read off a galvanometer mirror 41 onto the reading head 12. Servomechanism means 62 of a well known type provides automatic tracking of mirror 41 and lens 40 to maintain the projected image in proper relationship with the reading head as later described. Such servomechanism means 62 is utilized in coordination with a carriage servomechanism means 60 as shown.

The reading head 12, light source 36, lens 40, and mirror 41 are mechanically connected to carriage 44, as indicated by dashed lines, to position the assembly to read the desired track set appearing on the disc. The reading head 12 and related amplifying circuitry 42 are provided such that the vertical spacing between the diodes 14a-14j and 16 corresponds to the track spacing in the magnified image which is projected onto the reading head.

Diodes 18a and 18b are positioned immediately above and below the horizontal center line of video sensing element 16. These diodes receive unequal amounts of light from the video track V, if the image is misaligned on the reading head 12, and a correctional signal is derived from the outputs of these diodes which is applied to tracking servomechanism 62 from controller 58 to maintain reading head 12 in proper alignment with the projected image. All the sensing diodes shown are mounted in a substrate and connections to the diodes are made by conductive traces on the substrate and by pins which project from the substrate (not shown). The traces and pins are of conventional nature and have been omitted from the drawing for clarity of illustration.

By way of explanation, the galvanometer mirror 41 in connection with the tracking elements 18 maintains continuous tracking of the video track V with the video sensing element 16. This is accomplished by "rocking" the galvo mirror 41 through an angular range. Such rocking is at the rate of rotation of the disc to accommodate any eccentricity of the track resulting from miscentering. Typically the miscentering will be 10 times greater than the track width. Also, the galvanometer eliminates excursions caused by mechanical vibrations. These excursions can easily exceed the track width or center-to-center track tolerance. The galvanometer mirror and its associated drive circuitry are designed so that they will perform these two tracking functions without significant inertial lag.

In addition to these two tracking functions, the galvanometer can also carry out a step function. That is, the galvanometer, by a fixed change in its angular position, will cause the image of the tracks to be displaced by one track-center-to-track-center distance on the diodes.

After suitable amplification from amplifying circuit 42, the signal from video sensing element 16 is applied to a video monitor circuit and screen 54.

Signals from audio sensors 14a-14j are amplified through amplifier circuit 42 and fed into a multiplexer means 64 which, under the control of audio track selector 46 delivers the audio information from successive ones of the audio sensor diodes 14a-14j through an A/D converter 48 to a digital data store means 50 during successive revolutions of disc 10.

In this manner the video information is reproduced repeatedly while the audio information is reproduced sequentially to provide extended audio information for the TV picture.

When all the audio information from the audio tracks A for the TV picture frame has been reproduced sequentially, the carriage 44 is shifted to bring the connected reading head, light source, lens and galvo mirror into position to read the tracks for another frame. This cycle continues from one TV picture to the next as desired. If less than 9 tracks A of audio are recorded, the disc may be repositioned for the next TV frame by a switch control signal placed at the end of the audio signal.

IMPROVEMENT OF THE PRESENT INVENTION

As shown in FIG. 3, the various signals picked up by reading head 12 feed into pick-up amplifier 42 and are transmitted thereon to multiplexer means 64 and video monitor 54. In addition, these signals are fed into a multiplexer or "mux" circuit means 64 where each respective signal from pick-up amplifier 42 may be successively selected from the signal group by either microprocessor controller 58 or audio track selector 46. The output of the "mux" circuit 64 feeds into A/D converter 48 and discriminator or filter circuit 66. As provided, discriminator 66 may pass only a range of frequencies slightly above 15,000 hertz and below, for example, less than 16,000 hertz. Since the video signal has a dominant frequency at 15,750 hertz and the compressed audio signal ranges from 30 to 300 kilohertz, the discriminator 66 will pass the video signal V and reject all of the compressed audio signal A.

The discriminated video signal feeds from discriminator 66 into a microprocessor comprising controller 58. A microprocessor such as provided for controller 58 is commercially available with a 6502 MOS-Technology processor being one example, with this microprocessor configured on a Synertek SYM 1 microcomputer board being a further example.

The controller 58 feeds a signal into a servomechanism 60 which serves to position carriage 44 along with reading head 12, light source 36 and the mirror lens assembly 40-41. The controller 58 also feeds a signal into a servomechanism means 62 which positions galvanometer mirror 41 in incremental steps both to step the tracks in incremental spacings with respect to the video head 12 and its associated sensing element diodes and also moves carriage 44 to approximately position the projected image of the video track V with respect to the video sensing element 16.

METHOD OF THE PLAYBACK OPERATION

The previously recorded video disc 10 is placed on flange 30 and secured by hub 32. Carriage 44 is appropriately positioned to align lens 40 with the audio and video tracks for the desired video frame. The galvanometer mirror 41 is initially positioned to correctly fine tune or minutely position a video track V with respect to the video sensing element 16.

As the disc 10 is rotated, the video track V and all the audio tracks A for the desired frame are scanned simultaneously by diodes 16 and 14a-14j of the reading head 12.

The video information is processed repeatedly during successive revolutions of the disc and the picture represented by that information is reproduced repeatedly on monitor 54.

The multiplexer means 64 passes the audio information from successive respective audio tracks A through A/D converter 48 to the data store 50 during successive revolutions of the disc 10. Thus, while the video information is reproduced repeatedly, the audio information is reproduced sequentially to provide the extended audio for the picture. The compressed audio information is released from data store 50 on a real time basis through D/A converter 52 and reproduced in speaker 56.

When the audio information from all of the tracks for the first frame has been reproduced, the carriage is shifted to bring the light source, lens and reading head into position to read the track set for another TV frame. This process continues until the desired number of frames have been reproduced and displayed. If less than nine tracks of audio are recorded, the disc 10 may be repositioned for the next frame upon completion of the information which is present on the audio tracks. A control signal can be recorded in the audio track where the last audio information is found to condition the apparatus to switch to the track for the next TV frame.

It is evident that the combined presentation of the audio and video signals as provided by this apparatus is a presentation somewhat analogous to earlier presentations of photographic slides accompanied by either a commentary from an individual person or a tape recording. Many advantages can be seen in the presentation of this invention, however, since little if any time is lost in repeatedly presenting the slides successively, and the audio commentary accompanies the video picture without delay, ambiguity or change.

A substantial problem has been to sufficiently precisely control the step of switching from one video track to the successive video track without delay.

The first approach was to successively step the galvo mirror 41 through the entire 10 tracks which of course required an excessive time of 0.25 second from track to track or a 2.5 seconds total from frame to frame, i.e., from one video track V to the next. Such time lag was not tolerable, and reliability of this approach was not adequate.

The sequence of the present method is as follows.

First, the video track V and its associated audio tracks A when completed are terminated with a signal from the audio tracks A to actuate the controller 58. Controller 58 thereupon causes the servomechanism 60 to slew the carriage, reading head and associated detection elements a distance from the completed video track estimated to be on, or very nearly on, to the succeeding video track.

It is pointed out this movement is a "slew" rather than a step. A "slew" is a very rapid motion of the head 12 and the head thereby can be slewed in about 30 milliseconds. However, when the head is slewed so rapidly, precise control of its destination position is difficult without providing excessively expensive control. Such position of course has to be within two or three microns for proper playback given a 14 micron track-center-to-track-center distance.

Accordingly, in the present apparatus the slew is a quick step which gets the reading head within at least a couple of tracks of its destination position. Controller 58 also causes the galvanometer to be "disabled," that is to bring the mirror 41 to an initial rest or start position while the slew is being completed, for 50 milliseconds, for example. This allows the servomechanism 62 to be restarted from a known position once the slew is completed. At the end of the slew movement, the two flank or tracker diodes 18 will pick up any track and stabilize galvanometer 41 within 50 milliseconds. It will position the video sensing element 16 on that track whether or not it is a video track. The tracker diodes are not sensitive to track content and will home on any track within range. After the restarting, the video sensing element 16 will be right on video track V, or one, two, or three or more tracks away.

As provided, the controller 58 causes a scan through diodes 14a-14j to take place, and senses and identifies each information signal from each diode with respect to its content. Thus the controller has the signal information for actuating the servo 62 to step the galvanometer 41 in the appropriate direction as later described. For example, if the video track lies on diode 14b rather than the correct diode 16, the results of the scan will indicate to the controller that the desired video track is displaced two track positions, and will also indicate the direction. As another example, if video track V lies correctly on diode 16, then the diode scan will show no video characteristics passing through discriminator 66, and the controller will terminate the whole stepping and homing sequence and being the audio replay.

Assuming the first example, galvanometer 41 is now stepped the required number of two steps, to bring the video track V under the video sensing diode 16. Each step of the galvanometer 41 as described requires about 25 milliseconds.

Now, if the multiplexer 64 scans through the nine audio diodes 14a-14j and there is no output, this means there is no video track in range of the audio diodes. This means that the galvanometer stepping was accurate and the video sensing element 16 is tracking on the video track V. The scanning requires five milliseconds per track, or 45 milliseconds to sweep through all the tracks.

So now within about 250 milliseconds or less (which includes the slewing time of 30 milliseconds) a new video track has been brought into the correct position, along with its associated track set. In other words, the entire switch cycle, from one track set to the next track set, has taken no more than 0.25 seconds before proceeding with the succeeding video frame. This switch time is short compared to the time required for a typical television monitor to stabilize its display; such a short switch time generally is not perceptible by a human observer.

In summary, means are provided for identifying a video track imbedded in an audio track matrix. Searching and tracking means are provided which consists of a multiplexing circuit with a narrow pass filter and an appropriately programmed controller, which is the microprocessor provided.

This invention may be seen to have a number of important features and advantages, the most important of which is to provide playback of discrete TV pictures each having extended audio information with switching from one TV picture to the next with less switching time than is evident to the human eye.

As apparent from the foregoing, a new and improved system and method for reproducing video pictures and related audio information is provided. While presently only certain preferred embodiments have been described it will be apparent to those familiar with the art that certain changes and modifications can be made without departing from the purview of the invention as defined by the following appended claims.

We claim:

1. In a system for optically reproducing video signals and related audio signals recorded on a rotary disc in the form of successive sets of concentric tracks, each such track set being composed of a video track followed by at least one audio track and wherein a movable array of video and audio sensing elements is adapted to be positioned to receive simultaneously said respective video and audio signals, the means for correctly aligning the sensing elements of said array and the respective tracks within each of said sets comprising:
    a. controller means for moving the optical image of said tracks in a radial direction relative to said array, and
    b. scanning means responsive to the presence of a video signal on the output of one of said audio sensing elements for generating an error signal whose amplitude and polarity correspond to the magnitude and direction of said misalignment, said error signal being operatively coupled to said controller means so as to produce the necessary radial movement of said optical image, said scanning means comprising in combination means for scanning the output of each of said audio sensing elements and frequency discrimination means operatively interconnected between the output of said scanning means and said controller means, said discriminator means being adapted to pass only video frequencies.

2. The system of claim 1 wherein the amplitude of said error signal is determined by the radial position within said array of the audio sensing element whose output carries a video signal and whose polarity is determined by the direction of radial displacement between the video sensing element of said array and the video track with which it is adapted to register in playback.

3. In the method for reproducing visible and audible information recorded on a rotary disc in the form of successive sets of tracks, each such track set being composed of at least one video and one audio track, wherein signal pickup means are provided for sensing the information simultaneously on all tracks of each such track set, said signal pickup means comprising a movable array of video and audio sensing elements adapted to be positioned to receive simultaneously the visible and audible information on each such track set, the method of switching said signal pickup means from playback registration with one said track set to the next succeeding set comprising:
    a. slewing said signal pickup means radially of said disc responsive to any of a plurality of like switching signals imbedded in a selected track of each said track sets through a distance estimated to position said signal pickup means roughly in a playback relationship with the next succeeding track set; and
    b. thereafter scanning the output of each of said audio sensing elements, in order to enable detection of the presence of a video signal on any of said outputs and, if present, utilizing said video signal as an error signal to effect the subsequent incremental movement of said pickup means into playback registration with said next succeeding track set.

4. The method of claim 3 including the step of continuing to home said pickup means with respect to each said track set during the entire playback thereof.

* * * * *